United States Patent [19]

Feilen

[11] Patent Number: 5,018,347
[45] Date of Patent: May 28, 1991

[54] LAWN MOWER BLADE REPLACEMENT CUTTING EDGE APPARATUS

[76] Inventor: Michael A. Feilen, 39 W 365 Hogan Hill, Elgin, Ill. 60123

[21] Appl. No.: 519,805

[22] Filed: May 7, 1990

[51] Int. Cl.$^5$ .............................................. A01D 34/73
[52] U.S. Cl. ....................................... 56/295; 30/335; 30/337; 30/349
[58] Field of Search .................... 56/295, 255; 30/329, 30/335, 337, 347, 348, 349, 351; 408/713

[56] References Cited

U.S. PATENT DOCUMENTS

| | | | |
|---|---|---|---|
| 2,576,884 | 11/1951 | Leigh | 56/295 |
| 2,869,311 | 1/1959 | Beeston, Jr. | 56/295 |
| 3,545,189 | 12/1970 | Gillespie et al. | 56/295 |
| 3,665,692 | 5/1972 | Hughes | 56/295 |
| 3,762,138 | 10/1973 | Michael | 56/295 |
| 4,375,148 | 3/1983 | Beck | 56/295 |
| 4,445,315 | 5/1984 | Roszkowski | 56/295 |
| 4,611,460 | 9/1986 | Parker | 56/295 |
| 4,651,510 | 3/1987 | Malutich | 56/13.4 |
| 4,750,320 | 6/1988 | Liebl | 56/295 |
| 4,779,407 | 10/1988 | Pattee | 56/295 |

*Primary Examiner*—Bruce M. Kisliuk
*Attorney, Agent, or Firm*—Leon Gilden

[57] ABSTRACT

An apparatus wherein an elongate lawn mower blade body includes a forwardly extending flange and a rearwardly extending flange, wherein each flange includes a slot extending along the flange spaced from an end edge surface of the cutting blade a predetermined distance. A polymeric replacement blade, including a "T" shaped projection directed rearwardly of the blade, is receivable within the slot, wherein the blade includes a top and bottom surface aligned with a respective top and bottom surface of the associated blade body. Modifications of the invention include metallic reinforcement cast within the blade and optionally utilizing an "S" shaped blade to position the blade underlying the blade body.

2 Claims, 4 Drawing Sheets

PRIOR ART

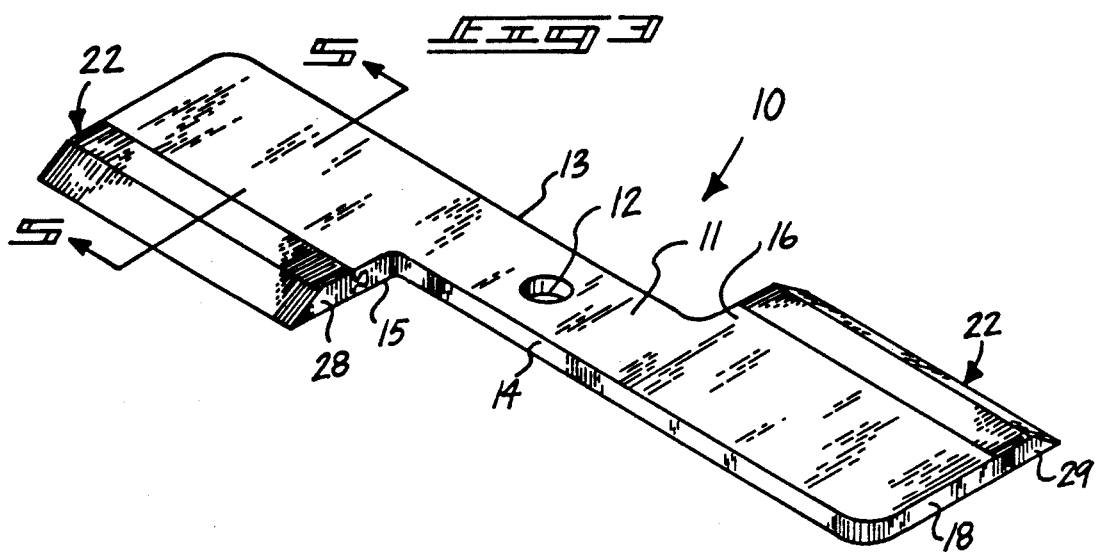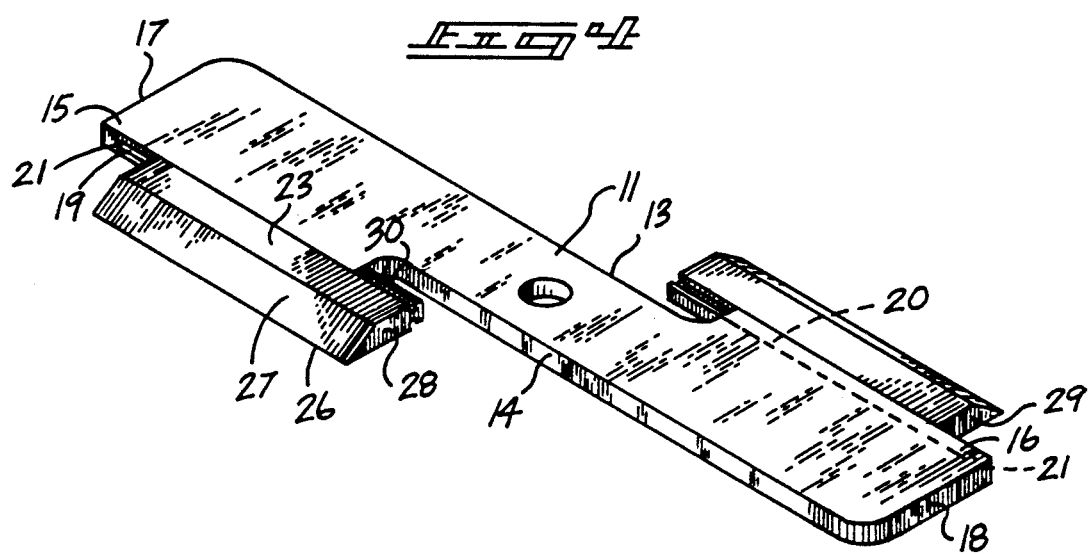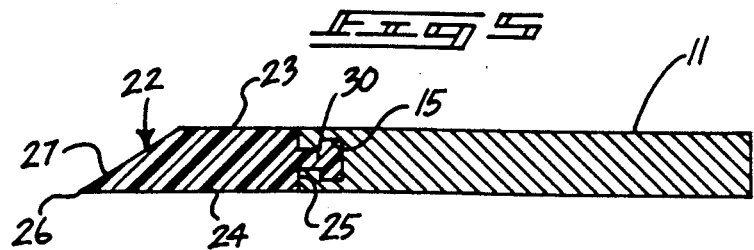

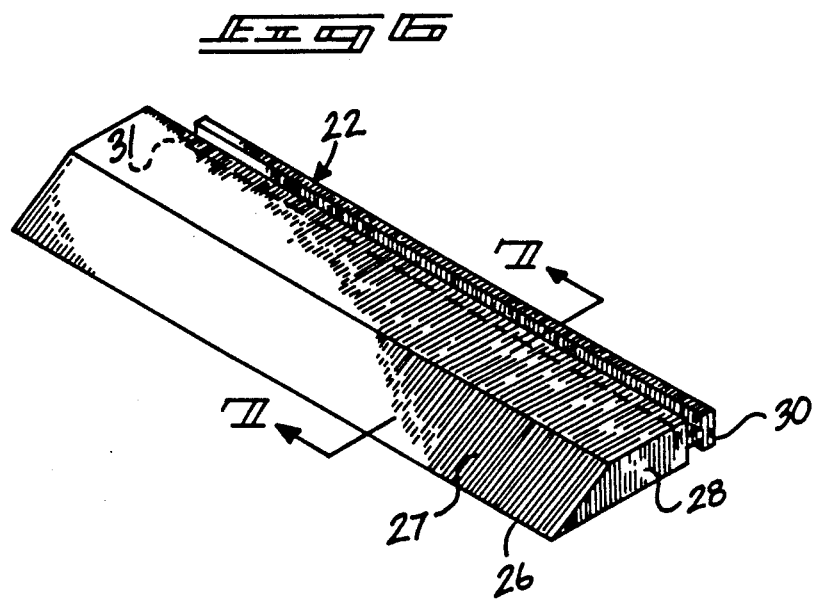
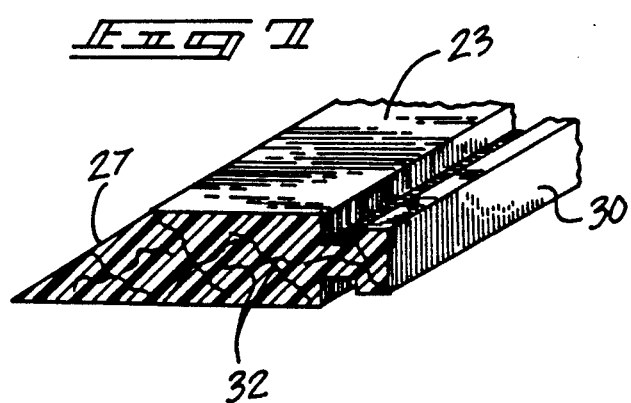
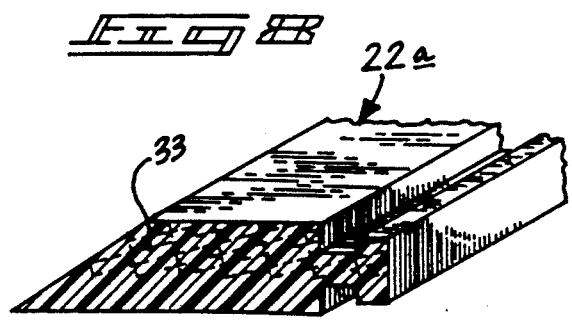

LAWN MOWER BLADE REPLACEMENT CUTTING EDGE APPARATUS

BACKGROUND OF THE INVENTION

1. Field of the Invention

The field of invention relates to lawn mower blades, and more particularly pertains to a new and improved lawn mower blade replacement cutting edge apparatus wherein the same permits selective replacement of a lawn mower blade cutting edges subject to need.

2. Description of the Prior Art

In replacement of conventional lawn mower blades, an individual is required to remove the complete lawn mower blade body relative to an associated lawn mower. It is at that juncture required that the individual fixedly secure the blade relative to an associated lawn mower housing with potential injury resultant from this manipulation. Prior art lawn mower blades have been provided to utilize replacement edges, but have heretofore been of a relatively awkward and extensive construction relative to the instant invention defining a streamlined and readily replaceable lawn mower blade edge construction. Examples of the prior art include U.S. Pat. No. 4,651,510 to Malutich wherein replacement lawn mower blade edges are provided, wherein the blades include slot members cooperative with beveled projections mounted to forward and rear edge surfaces of the associated lawn mower blade. The blades each include a cutting edge mounted within a complementary recess of the blade body.

U.S. Pat. No. 4,445,315 to Roszkowski sets forth a disposable cutting edge for use with a lawn mower, wherein the cutting edge is defined by a sleeve receivable within a projection of an associated lawn mower blade body and includes a snap fastener securable to a recess formed within the blade body.

U.S. Pat. No. 3,665,692 to Hughes provides the use of replacement lawn mower blades mounted within an associated lawn mower blade body utilizing throughextending fastener members to secure the blade body within channels defined within each end of the blade body.

U.S. Pat. No. 4,750,320 to Liebel sets forth a rotary cutting blade utilizing replacement edges that are formed with sleeves to surmount opposing terminal ends of a lawn mower blade body.

U.S. Pat. No. 4,611,460 to Parker sets forth a lawn mower blade construction with replacement cutting edges securable to the blade body by use of separable fasteners.

As such, it may be appreciated that there continues to be a need for a new and improved lawn mower blade replacement cutting edge apparatus wherein the same addresses both the problems of ease of use, as well as effectiveness in construction in permitting selective replacement of lawn mower blade edges, particularly of selective reinforcement construction, and in this respect, the present invention substantially fulfills this need.

SUMMARY OF THE INVENTION

In view of the foregoing disadvantages inherent in the known types of replacement cutting edges for lawn mower blades now present in the prior art, the present invention provides a lawn mower blade replacement cutting edge apparatus wherein the same permits selective replacement of composite polymeric, as well as polymeric and metallic, cutting blades. As such, the general purpose of the present invention, which will be described subsequently in greater detail, is to provide a new and improved lawn mower blade replacement cutting edge apparatus which has all the advantages of the prior art replacement cutting blades for lawn mowers and none of the disadvantages.

To attain this, the present invention provides an apparatus wherein an elongate lawn mower blade body includes a forwardly extending flange and a rearwardly extending flange, wherein each flange includes a slot extending along the flange spaced from an end edge surface of the cutting blade a predetermined distance. A polymeric replacement blade, including a "T" shaped projection directed rearwardly of the blade, is receivable within the slot, wherein the blade includes a top and bottom surface aligned with a respective top and bottom surface of the associated blade body. Modifications of the invention include metallic reinforcement cast within the blade and optionally utilizing an "S" shaped blade to position the blade underlying the blade body.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved lawn mower blade replacement cutting edge apparatus which has all the advantages of the prior art lawn mower replacement blades and none of the disadvantages.

It is another object of the present invention to provide a new and improved lawn mower blade replacement cutting edge apparatus which may be easily and efficiently manufactured and marketed.

It is a further object of the present invention to provide a new and improved lawn mower blade replacement cutting edge apparatus which is of a durable and reliable construction.

An even further object of the present invention is to provide a new and improved lawn mower blade replacement cutting edge apparatus which is susceptible of a low cost of manufacture with regard to both materials and labor, and which accordingly is then susceptible of low prices of sale to the consuming public, thereby making such lawn mower blade replacement cutting edge apparatus economically available to the buying public.

Still yet another object of the present invention is to provide a new and improved lawn mower blade replacement cutting edge apparatus which provides in the apparatuses and methods of the prior art some of the advantages thereof, while simultaneously overcoming some of the disadvantages normally associated therewith.

Still another object of the present invention is to provide a new and improved lawn mower blade replacement cutting edge apparatus wherein the same selectively and conveniently provides accommodation for one of a plurality of cutting edges for mounting on an associated blade support body.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is an isometric illustration of the instant invention.

FIG. 4 is an isometric illustration of the instant invention illustrating the replacement cutting blades in a partially assembled configuration relative to the support body.

FIG. 5 is an orthographic view, taken along the lines 5—5 of FIG. 3, in the direction indicated by the arrows.

FIG. 6 is an isometric illustration of the replacement cutting blade apparatus of the instant invention.

FIG. 7 is an isometric illustration, taken along the lines 7—7 of FIG. 6, in the direction indicated by the arrows.

FIG. 8 is a further example of a modified blade construction utilized by the instant invention.

DESCRIPTION OF THE PREFERRED EMBODIMENT

Figure 1:
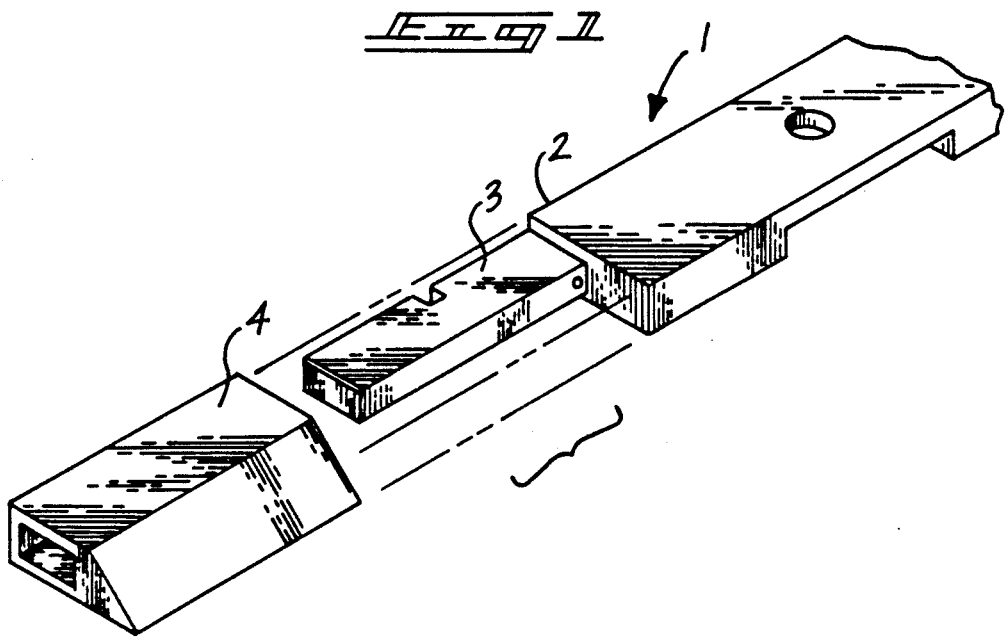
FIG. 1 is an isometric illustration of a prior art lawn mower blade replacement cutting edge apparatus.

With reference now to the drawings, and in particular to FIGS. 1 to 11 thereof, a new and improved lawn mower blade replacement cutting edge apparatus embodying the principles and concepts of the present invention and generally designated by the reference numeral 10 will be described.

Figure 2:
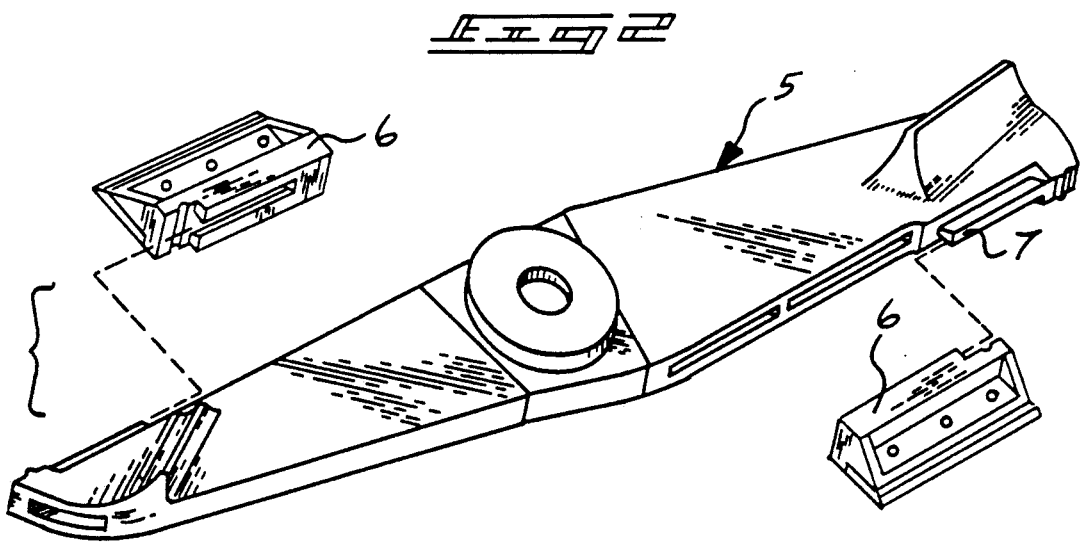
FIG. 2 is an isometric illustration of a further example of a prior art replacement cutting edge apparatus for use in a lawn mower blade.

FIG. 1 illustrates a prior art lawn mower blade construction 1, wherein the blade body 2 utilizes a longitudinally extending shoulder 3 of a reduced cross-sectional configuration to receive a replacement blade 4 defined as a sleeve, including a clip member to be received within a notch of the blade body construction. FIG. 2 illustrates a further example of a lawn mower blade utilized in replacement cutting edges, wherein the blade body utilizes outwardly extending projections 7 positionable within slots of an associated cutting blade structure 6, as illustrated.

More specifically, the lawn mower blade replacement cutting edge apparatus 10 of the instant invention essentially comprises an elongate planar "S" shaped support body 11, including a mounting aperture 12 directed orthogonally through the body and positioned medially thereof. The body 11 is defined by a rear edge 13 spaced from and parallel to a forward edge 14. A forward blade support head flange 15 is mounted forwardly of and parallel to the forward edge 14, with a rear blade support head flange 16 directed rearwardly of and extending beyond in a parallel relationship to the rear edge 13. The forward and rear head flanges 15 and 16 are mounted to extend in opposed directions at opposed terminal ends of the support body 11. The support body 11 and forward support head flange 15 are defined by a first end edge 17 spaced from and parallel to a second end edge 18 at an opposed end of the support body 11, as illustrated in FIGS. 3 and 4 for example. A first "T" shaped slot 19 is formed through the forward blade support head flange 15 arranged generally parallel the forward edge 14 and spaced from the first end edge 17 a predetermined distance, wherein the distance is defined from a shoulder 21 defining the forwardmost extent of the first "T" shaped slot 19 to the first end edge 17. Similarly, a second "T" shaped slot 20 is formed through the rear blade support head flange 17 and spaced from the second end edge 18 the same predetermined distance defined between a like shoulder 21 to the second end edge 18.

A polymeric blade member 22 is slidably received within each of the first and second "T" shaped slots 19 and 20. Each polymeric blade member 22 is defined by a top surface 23 spaced from and parallel to a bottom surface 24. The blade member 22 further includes a blade member rear surface 25 orthogonally oriented relative to the top and bottom surfaces 23 and 24, and wherein the bottom surface 24 extends forwardly and terminates in an elongate cutting edge 26 arranged parallel to and coextensive with the rear surface 25. A beveled surface 27 extends from the top surface 23 downwardly and forwardly to the bottom surface 24 to define the aforenoted elongate cutting edge 26. Further, each blade member 22 is defined by parallel inner and outer end surfaces 28 and 29 arranged orthogonally relative to the top surface, bottom surface, and rear surface of each blade member 22. A "T" shaped flange 30 extends along the rear surface 25 of each blade member extending from the inner end surface 28 to a terminal position 31 spaced from the outer end surface 29 a spacing equal to the aforenoted predetermined distance, whereupon positioning of a blade member 22 within an associated first and second "T" shaped slot effects alignment of the outer end surface 29 with a respective first and second end edge 17 and 18 at each end of the blade body 11. Further, during rotation of the blade, centrifugal force maintains the blade members 22 within their desired orientation within each respective first and second "T" shaped slot 19 and 20.

FIG. 7 illustrates the polymeric blade member 22 utilizing random metallic reinforcing strips 30 to direct throughout the body of each blade member 22 for reinforcement of the blade body while permitting flexure of the blade body in use to accommodate various impact encountered during a cutting procedure.

FIG. 8 illustrates the blade member 22a utilizing a reinforcing mesh 33 mounted coextensively with the blade member body throughout an upper one-half to two-thirds portion of the blade body to provide reinforcement of the blade body while permitting flexure of the lower one-half to two-thirds portion of the blade body not provided with the reinforcing wire mesh 33, as illustrated.

Figure 9:
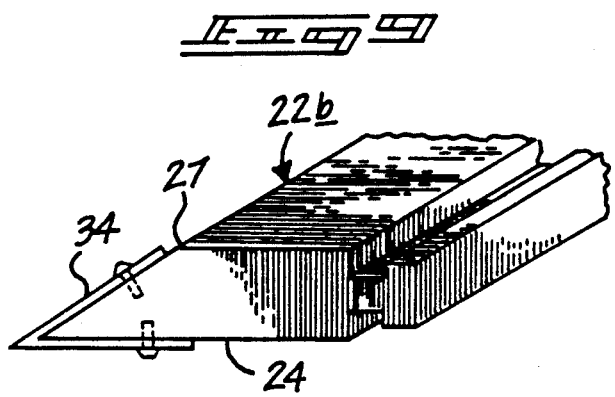
FIG. 9 is an isometric illustration of a yet further modified blade construction.
Figure 10:
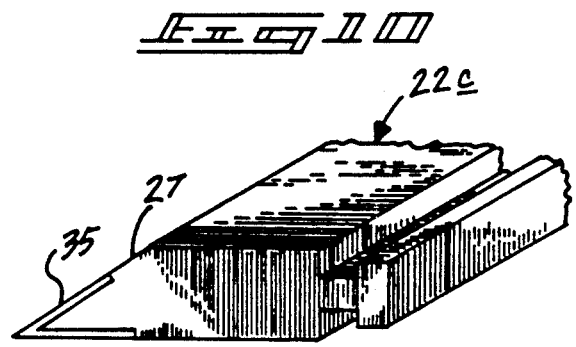
FIG. 10 is an isometric illustration of a yet further modified blade construction.

FIG. 9 illustrates a further blade body 22b utilizing a "V" shaped metallic cutting plate 34 mounted overlying the beveled surface 27 and the bottom surface 24. FIG. 10 illustrates a similar, but modified, blade body 22c wherein a "V" shaped reinforcing edge 35 is cast within a complementary recess formed throughout the beveled surface 27 and the bottom surface 24.

Figure 11:
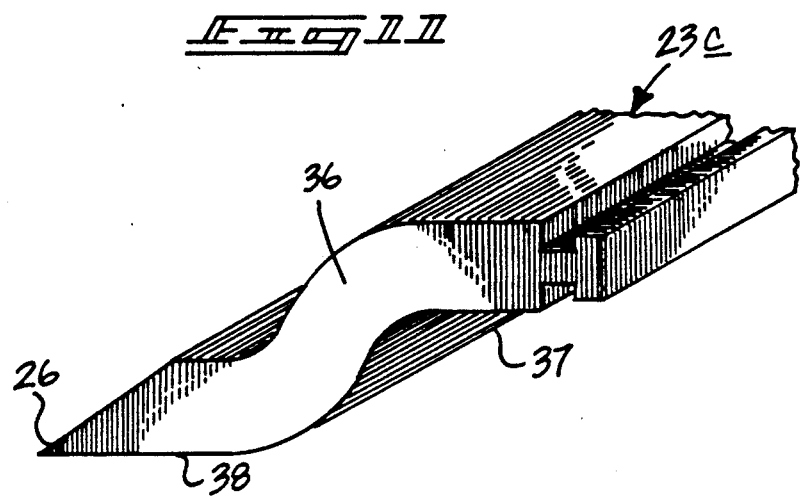
FIG. 11 is an isometric illustration of a still further modified replacement blade construction.

FIG. 11 illustrates a yet further modified blade body construction 23c wherein a generally "S" shaped blade body 36 is provided to provide a replacement blade body for use in a procedure to closely crop a grass surface. The "S" shaped body 36 is defined by a first blade body bottom surface 37 spaced from and parallel to a second blade body bottom surface 38, with the cutting edge 26 formed coextensively with the second bottom surface 38 to effect the close cutting procedure provided by the "S" shaped body construction, as illustrated.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A rotary lawn mower blade arranged for rotative mounting to a lawn mower, comprising:
    an elongate generally "S" shaped body, including a forward edge spaced from a rear edge, and
    a first end edge surface spaced from and parallel to a second end edge surface defining opposed ends of the body, and
    a top surface spaced from and parallel to a bottom surface, and
    a forward blade support head flange extending forwardly and beyond the forward edge including a forward blade body end surface, and
    a rear blade support head flange extending rearwardly and beyond the rear edge, including a rear blade body end surface, the forward blade body end surface aligned with the first end edge surface, and
    the rear blade body end surface aligned with the second end edge surface, and
    a first slot formed in the forward blade support head flange, and a second slot formed in the rear blade support head flange, wherein the first and second slots are arranged parallel relative to one another, and
    a replaceable blade member slidably mounted in each of the first and second slots, and
    wherein the first slot in the forward blade support head flange extends to a first shoulder, the first shoulder spaced from the first end edge surface a predetermined distance, the second slot extending in the rear blade support head flange to a second shoulder, the second shoulder spaced from the second end edge surface the predetermined distance, and
    wherein the blade member includes a blade member top surface aligned with the body top surface, and a blade member bottom surface aligned with the body bottom surface, and a blade member rear surface arranged orthogonally relative to the blade member top surface and the blade member bottom surface, and a rearwardly extending "T" shaped flange extending rearwardly of the blade member rear surface, and the blade member including an inner end surface spaced from and parallel to an outer end surface, the outer end surface aligned with the first end edge surface when the blade member is positioned within the first slot, and the outer end surface of the blade member positioned within the second slot aligned with the second end edge surface, and the "T" shaped flange extending along the blade member rear surface to a terminal position, the terminal position spaced from the outer end surface of each blade member a distance equal to the predetermined distance, and
    wherein the blade member is formed of a polymeric material, and
    wherein the blade member includes metallic reinforcement formed within the blade member, and
    wherein the metallic reinforcement includes a reinforcing wire mesh, the reinforcing wire mesh extending from the blade member top surface a distance substantially equal to one-half to two-thirds of a predetermined height defined between the blade member top surface and blade bottom surface to effect reinforcement of the blade member and subsequently permitting flexure of the blade member during use.

2. A rotary lawn mower blade as set forth in claim 1 wherein the blade member is defined by a generally "S" shaped configuration, and includes a further bottom surface below and parallel to the bottom surface, and wherein a cutting edge defined by the blade member is formed at a forward terminal end of the further bottom surface of the blade member.

* * * * *